United States Patent [19]

Junowicz

[11] 4,208,811

[45] Jun. 24, 1980

[54] DISPLAY WITH OVERLAPPING PICTURE ELEMENTS

[76] Inventor: Enrique Junowicz, 416 Clinton Rd., Brookline, Mass. 02146

[21] Appl. No.: 965,293

[22] Filed: Nov. 30, 1978

[51] Int. Cl.$^2$ .............................................. G09B 19/00

[52] U.S. Cl. ......................................... 35/27; 430/396

[58] Field of Search ........................... 35/26, 27; 96/45; 46/16

[56] References Cited

U.S. PATENT DOCUMENTS

| | | | |
|---|---|---|---|
| 1,844,079 | 2/1932 | Sutphen | 96/45 |
| 2,534,550 | 12/1950 | Frechtmann | 35/27 |
| 2,759,295 | 8/1956 | Keuls | 35/27 X |
| 3,002,309 | 10/1961 | Snyder | 35/27 X |
| 3,384,982 | 5/1968 | Herbert et al. | 35/26 |
| 3,625,149 | 12/1971 | Allen | 46/16 X |
| 3,987,558 | 10/1976 | Tsukamoto | 35/27 |
| 4,148,507 | 4/1979 | Fisher | 35/26 X |

FOREIGN PATENT DOCUMENTS

| | | | |
|---|---|---|---|
| 752440 | 7/1956 | United Kingdom | 35/27 |

*Primary Examiner*—William H. Grieb
*Attorney, Agent, or Firm*—David M. Warren

[57] ABSTRACT

An imaging system and display thereof utilizes a set of overlapping picture elements of varying tonalities. A set of tones is provided by picture elements of differing sizes, of differing density of graphic design, and by the use of first and second colors of differing proportions on each of the picture elements of a set of picture elements. The appropriate tones are selected by producing a coarse half tone image of a subject, and then approximating the elemental regions of the half tone image by elements of the set of picture elements. The selected elements are positioned on a substrate of the display at locations corresponding to the sites of a regular grid.

36 Claims, 11 Drawing Figures

DISPLAY WITH OVERLAPPING PICTURE ELEMENTS

BACKGROUND OF THE INVENTION

This invention relates to a display for producing a picture or design and, more particularly, to a display having picture elements which blend together to produce a photographic effect.

In the past, picture elements have been used for constructing pictures and designs on displays. Such displays have served as toys and games, and the formation of interesting designs has provided both a hobby and an educational experience. The form, layout, and coloration of the picture elements have been used to produce specific qualities to the resulting picture based on the characteristics of the individual picture elements.

A problem arises in that none of these displays have been able to provide the impact and the quality of a photograph or photo-design as may be seen by considering the following display technology.

First, it is noted that photographic techniques provide a variety of dramatic effects as may be seen in the book, "Darkroom Magic" by Otto Litzel which was published by the American Photographic Book Publishing Company in 1975, and in "Design by Photography" by O. R. Croy, which was published by Hastings House Publishers in 1972. The graphic picture effects are obtained by a variety of techniques such as tone-separation, posterization, half-tone and texture screening, and solarization. In addition, with the help of computer processing, the fragmentation of pictures according to preselected density values enables the production of computer generated pictures. Such computer generated pictures may be seen in "The Computer in Art" in page 20, by Jassia Reinchardt, which was published by van Nostrand Reinhold Company in 1971. However, there is no teaching as to how such effects can be produced by the manual or stepwise placement of picture elements on a display as would be performed by persons as a hobby and as an educational experience in understanding the perception of images.

With respect to a display formed of picture elements, the U.S. Pat. No. 3,987,558 which issued in the name of Tsukamoto on Oct. 26, 1976 shows a picture in FIG. 1 wherein the dark areas are laced with regions giving the appearance of lines which detract from the outlines of the dark areas. Similarly, the edges of the blocks shown in FIG. 17 are seen to detract from the picture quality, apparently from the arrangement of the blocks wherein all the edges of a group of blocks fall on a single line which catches the eye of an observer. Also, there is no teaching of the selection of a scale of tones, or color and graphic densities to produce designs of photographic qualities.

A similar problem in the alignment of the edges appears in the checkerboard arrangement disclosed in the U.S. Pat. No. 3,002,309 which issued in the name of Snyder on Oct. 3, 1961, and in U.S. Pat. No. 2,534,550 which issued in the name of Frechtmann on Dec. 19, 1950, neither of these patents disclosing the selection and production of a tone and/or chromatic scale. In the U.S. Pat. No. 3,384,982 which issued in the name of Herbert on May 28, 1968, it is disclosed that portions of the mounting panel are visible between the colored paper units to border the units and thereby enhance the visual effect of the units. Such enhancement of the separation of the colored paper units is counterproductive to the production of a photographic effect wherein there is to be no perception of the individual picture elements.

SUMMARY OF THE INVENTION

The aforementioned problem is overcome and other advantages are provided by a system for producing an image on a display, the display utilizing picture elements which, in accordance with the invention, may be manually positioned by persons to produce an image, such as a picture or design, which has photographic qualities. At least a portion of the picture elements are overlapped, the overlapping of the edges of the picture elements producing a blending of the elements which inhibits the perception of the edges by an observer of the display. In addition, the photographic effect is accomplished in accordance with the invention by selecting picture elements from individual groups of the elements wherein each group is composed of elements having a specific tone of a gray scale, or a specific tone of a color scale, and/or a specific density of a graphic design. For example, in the case wherein the photographic effect is to be produced by a set of eight tones, the effect is produced in one embodiment of the invention by utilizing eight groups of elements which are of equal size and equal shape. The elements of each group have markings or coloration to provide the visual effect of a single tone of the set of tones.

In an alternative embodiment of the invention the production of an individual tone is accomplished by placing an array of picture elements of equal shape, and equal coloration and/or graphic design, but of differing sizes, on a substrate of contrasting coloration. Assuming an exemplary display of dark picture elements on a light substrate, a region of large overlapping elements is perceived as a dark area while a region of small elements is perceived as a light area. Thus, by an appropriate selection of picture elements, a large number of light, dark, and intermediate areas are formed which are integrated by the eye of an observer and perceived as regions of an image having continuous variation in tonality.

In both embodiments of the invention, the picture elements are located on the sites of uniformly spaced points of a grid on the substrate or mounting panel. The picture elements are secured to the substrate by a pressure sensitive adhesive on the back sides of the picture elements, or by mounting each element on a stem which penetrates the substrate via apertures placed therein at the points of the grid. With respect to the production of the darker tones by the larger elements, the larger elements are of greater size than the spacing between grid points so that they overlap leaving small areas of the substrate showing between the elements. Thus, the light region is the reverse of the dark region since the light region is composed of the light substrate with small dark elements intersperced about the substrate. If desired, the light and dark areas may be reversed by placing light elements on a dark substrate. Also, it is noted that there are no edges to be perceived since the larger elements overlap each other.

A feature of the invention is found in the placing of the elements on the substrate. The elements are placed by hand and, accordingly, there are slight variations in the locations of the elements from the points of the grid. The use of the adhesive backing on the elements permits the foregoing variation in position. The same effect may be obtained with the previous embodiment by offsetting the stems from the centers of the picture elements. As a result, there is a local variation in the layout and the density of the elements, akin to the variation in tonality of an artist's paint stroke, which produces a more natural appearance to the image.

An additional feature of the invention is the placement of indicia on the grid points to identify the specific element to be placed thereon. Thereby, both children and adults can produce the desired image on the display. As an educational experience in understanding the effects of the various tones, the contrast of the design or picture can be altered by the person assembling the display from that suggested by the indicia on the grid points. For example, at the interface between two regions of differing tonality, the person may replace the suggested picture element with an element of a different tonality to see an accentuated or subdued interface.

The selection of the picture elements having the requisite tonalities to produce accurately the aforementioned photographic effect is accomplished by the use of half tone photography in conjunction with the reduction and a subsequent enlargement of an actual photograph of the subject to be imaged on the display. The photograph is first reduced in size and is then photographed through a half tone screen. The resulting half tone photograph is then enlarged to produce a likeness of the desired image. The number of cells per inch of the half tone photograph is substantially less than that customarily utilized in half tone photography because of the aforementioned reduction in size. The total number of cells in the half tone photograph is retained during the enlargement, the number of cells being equal to the number of picture elements to be utilized in the display. Due to the relatively small number of cells, the aforementioned likeness has a coarse appearance when viewed at short distances. The tonalities of the various cells, some of which may be blurred together, are then approximated by choosing individual elements from the set of the picture elements to be utilized in the display, the identity of each picture element being noted on the substrate by indicia imprinted at the corresponding locations on the grid.

BRIEF DESCRIPTION OF THE DRAWINGS

The aforementioned aspects and other features of the invention are explained in the following description taken in connection with the acompanying drawings wherein:

FIG. 2A shows the use of circular picture elements of differing sizes but of equal coloration;

DETAILED DESCRIPTION

Figure 1:
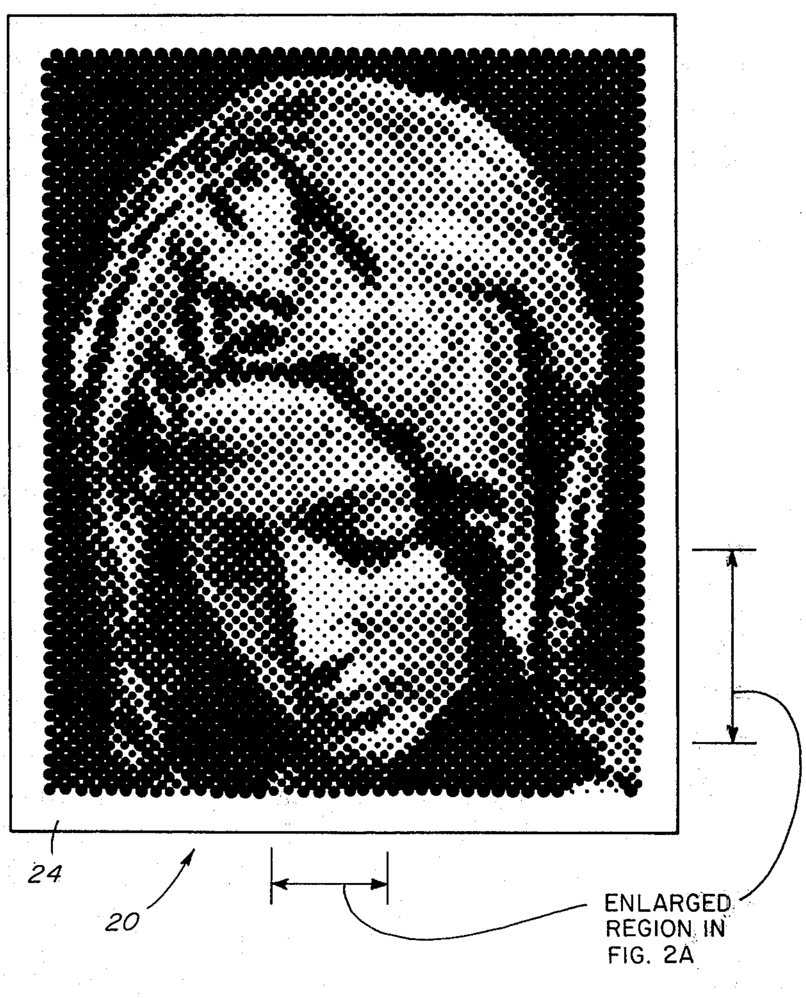
FIG. 1 shows a display formed by a set of picture elements having a predetermined number of specific tonalities in accordance with the invention, the display presenting an image of a human face which was obtained by photographing a stone sculpture.

Referring now to FIG. 1, there is seen a display 20 which, in accordance with the invention, is constructed of a set of picture elements which are secured to a substrate of the display 20. The picture elements may take the form of tiles, disks, pegs or similarly shaped objects which are readily manipulated by both children and adults. As will be seen in the ensuing figures, the picture elements may be colored or provided with a graphic design. A surface texture may be selected for the picture elements, for example, by applying a felt or other textured material to the picture element. The display 20 is formed in an exemplary manner by the use of picture elements in the form of disks which are uniformly colored and wherein variations in tonality are accomplished by a variation in the sizes of the disks. Alternatively, as will be seen in FIG. 2C with picture elements of equal size, variations in tonality may be accomplished by a variation in the coloration or graphic density of the picture elements.

Referring also to FIGS. 2A–D, there are seen three exemplary forms of picture elements 22 mounted on a substrate 24. The picture elements 22 are further identified by the letters A, B and C when it is desired to refer to a specific one of the elements 22. Thus, the elements 22A are circular shaped disks of uniform color and of varying sizes, the elements 22B are square shaped disks of uniform color and of varying size, and the elements 22C are circular disks of uniform size and of varying color or density of graphic design. The elements 22 are provided with an adhesive backing by which they are secured to the substrate 24.

Figure 2A:
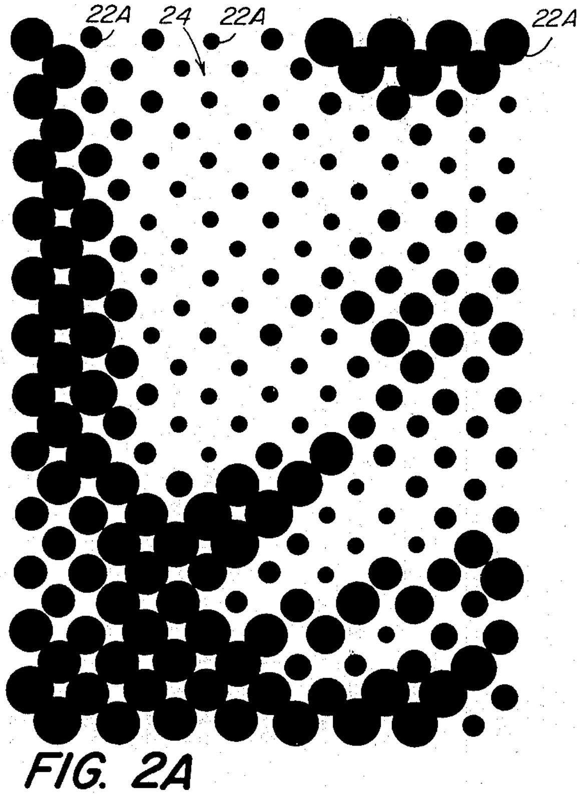
FIG. 2A shows an enlarged view of the nose and lip region of the face of FIG. 1, the nose being seen toward the left and the lips being seen at the bottom of the figure. One of the eyes is partially seen at the upper right of the figure.
Figure 2B:
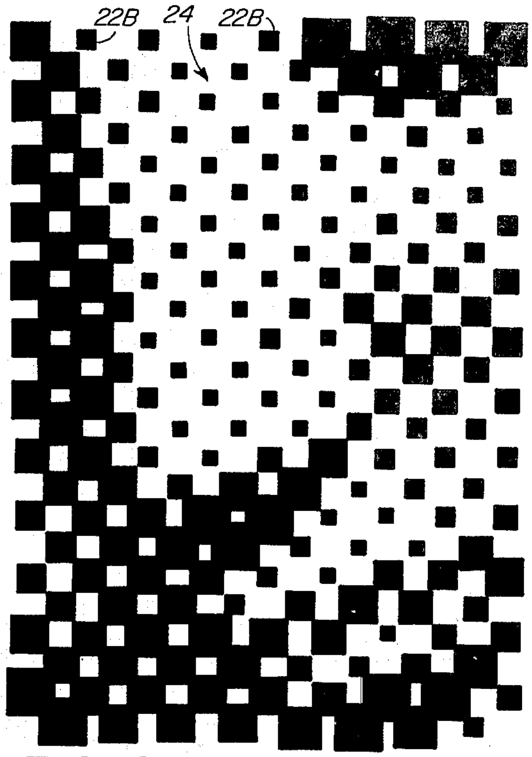
FIG. 2B presents an alternative embodiment of the display of FIG. 2A showing the use of square picture elements of differing sizes but of equal coloration.

FIG. 2A is an enlarged view of a portion of the face portrayed in the display 20 of FIG. 1, the display 20 being formed from the circular disk shaped elements 22A. The nose is seen to the left of FIG. 2A while the lips are seen at the bottom, and a portion of an eye is seen at the top of the figure. FIGS. 2B and 2C show the same portion of the face but refer to alternative embodiments of the invention utilizing the elements 22B and 22C.

All the picture elements 22 have the same basic color such as alizarin crimson, cadmium red, ultramarine blue, raw umber, or other specific color. Black may also be utilized in which case an exemplary gray scale can be obtained by the use of a black graphic design on a picture element 22 having a white background. A contrasting color is used for the substrate 24. For example, a white substrate may be used with black elements 22, and a black substrate may be used with white elements 22. An exemplary set of picture elements 22 consists of eight groups of elements with each group having a specific chroma or specific tone, also known as value, which differs from each of the chroma or tones of the other groups. The tonality or chroma is varied in a predetermined number of steps as will be described hereinafter.

The pictorial representation of the picture elements 22C of FIG. 2C is understood to represent either coloration or graphic design. The elements 22C are lighted by rays of light directed normally to the plane of the figure so that the edge lines of the elements 22C are not noticed in the elements 22C having the lighter tones. The tonality of the picture elements 22C may be varied by providing various densities of colored marks on each element 22C, or by mixing the color with various amounts of white and black. A set of tones may also be provided by mixing a first color with a second color, such as a dark blue and a light yellow, the effect being known as duotone in the printing art. Alternatively, the duotone effect is seen when the background of the element 22C is of the first color and the marks are of the second color. In both cases, an observer perceives shades of green varying from a dark blue green to a light yellow green. With respect to the graphic density, or density of the marks, the marks may have the shapes of dots, dashes, circles, wavy lines, or other convenient shape. The specific shape selected for the marks produces a perception of texture to an observer at moderate distances from the display 20. Typical viewing distances will be described hereinafer. At a large viewing distance, the marks and the background coloration of the elements 22 blend together to form a uniformly colored surface.

Figure 3:
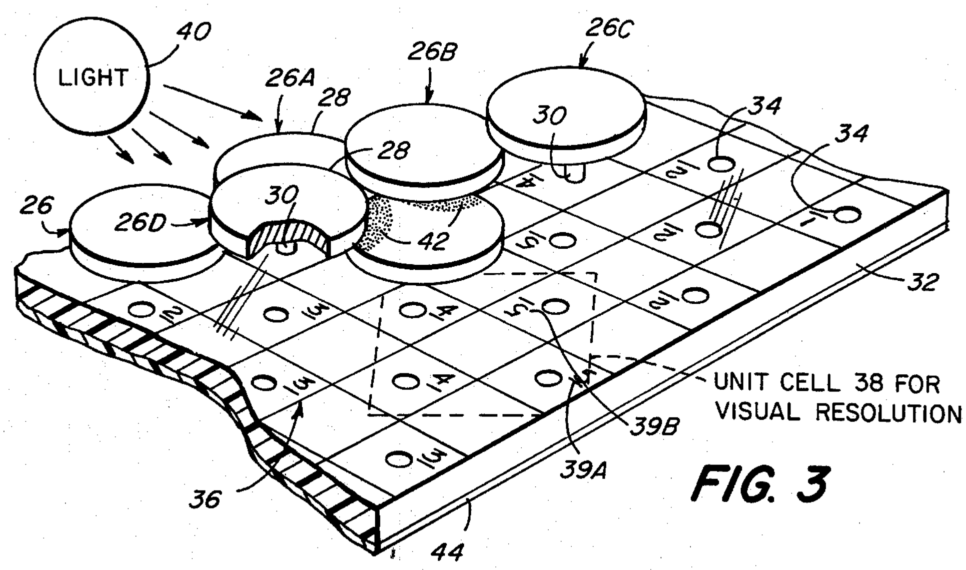
FIG. 3 shows a group of picture elements mounted by stems to a substrate, the figure also showing a grid for locating the elements, and a unit cell for visual resolution.

Referring also to FIG. 3, there is seen a further form of the picture elements, namely, picture elements 26 each of which comprises a tile 28 mounted on a stem 30. Individual ones of the picture elements 26 are further identified by the letters A–D when it is desired to refer specifically to these elements 26A–D. The elements 26 are secured at their respective locations on a substrate 32 by the placement of the stems 30 in apertures 34 in the substrate 32. The apertures 34 are located in a grid 36 shown superposed on the substrate 32 but not actually inscribed on the substrate 32. The locating of the elements 26 by the grid 36 corresponds to the location of cells in half tone screens utilized in photography. The locations of the picture elements 22 in FIG. 1 are similarly designated by a grid (not shown in FIG. 1) having the same form as the grid 36. Other grids such as a grid of hexagonal cells or a grid of triangular cells (not shown) may be used instead of the grid 36 of square cells.

FIG. 3 shows several picture elements 26 of sufficiently large diameter relative to the spacing of the elements 26 such that some of the elements 26 are seen to overlap other ones of the elements 26 which may be referred to hereinafter as underlapped elements. The size of the elements 26, relative to their grid 36, is equal to that of the larger ones of the elements 22 of FIG. 1 relative to their grid. In both FIGS. 1 and 3, at least a small region of the substrate is visible between adjoining picture elements. If desired, the largest picture elements 22 in FIG. 1 may be further enlarged to completely obscure the substrate 24 for maximum blackness of the dark regions.

The perception of an individual picture element 22 or 26 depends on the viewing distance. At a relatively short distance, an observer can perceive an individual element 22 or 26, while at larger distances a resolution element includes a plurality of picture elements, for example, four picture elements 26 as are identified by the exemplary resolution cell 38 in FIG. 3. In FIG. 1 wherein the display 20 has been drawn with dimensions of approximately five inches by four inches, a viewing distance in excess of approximately six feet provides a blending of the picture elements and a resolution cell which is greater than the size of a picture element. In the enlarged views of FIGS. 2A–C, the corresponding viewing distance is in excess of approximately twenty feet.

Figure 2D:
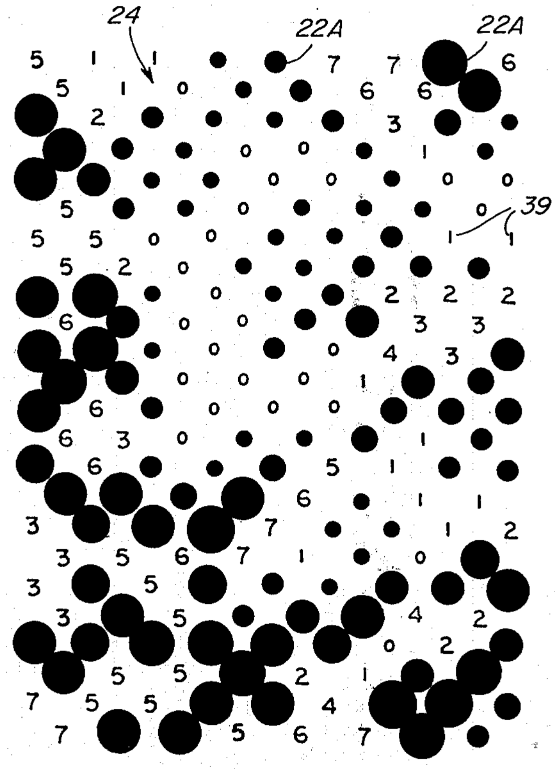
FIG. 2D demonstrates the placement of the picture elements of FIG. 2A upon indicia which designate the specific elements and their respective locations, some of the elements of FIG. 2A also being seen in FIG. 2D.
Figure 2C:
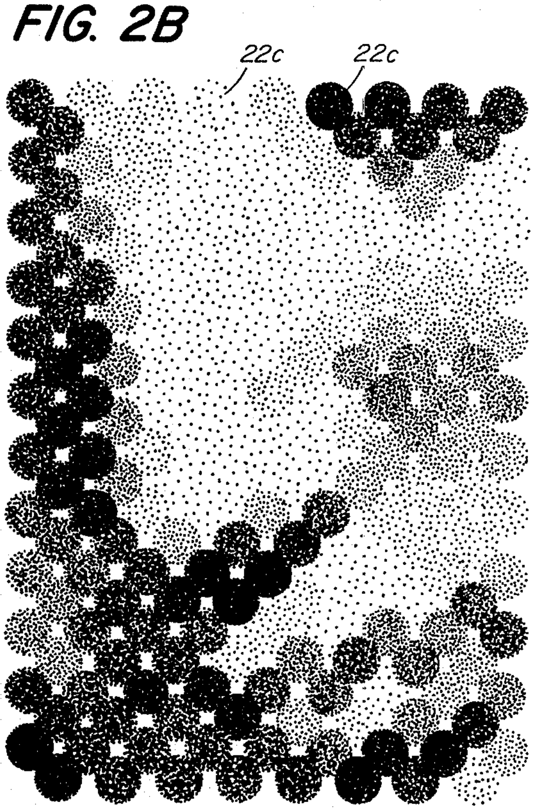
FIG. 2C presents an alternative embodiment of the display of FIG. 2A showing the use of circular picture elements of the same size and shape but of differing density of graphic design.

Indicia 39 are shown in FIGS. 2D and 3, some of the indicia being being further identified by the letters A–B when it is desired to refer to specific ones of the indicia such as the indicia 39A–B of FIG. 3. As will be seen in FIG. 4, the indicia designate specific ones of the picture elements to provide a desired tonality. As seen in FIG. 2D, a picture element 22A is placed on its corresponding indicia 39, the indicia 39 thereby designating the requisite locations of the elements 22A. FIG. 2D also demonstrates an optional format for the display wherein some of the picture elements are preprinted on the substrate to facilitate the construction of the display, particularly by children.

The picture elements 26 of FIG. 3 are seen to be illuminated obliquely by rays of light from a source 40 of light, the rays of light casting shadows 42 of the overlapping tiles 28 upon the underlapped tiles 28 thereby producing a three dimensional textural effect. The effect may be accentuated by the staircase arrangement of the elements 26A-B-C. As is seen by the stems 30 of the elements 26C and 26D, the latter shown partly cut away to expose the stem 30, a stem 30 extends well beyond the depth of a tile 28 to provide the various heights of the tiles 28 above the substrate 32. The textural effect may be incorporated in FIG. 1 by substituting the elements 26 in place of the elements 22. The effect is most pleasing when the sides and faces of the tiles 28 have the same color.

The substrate 24 of FIGS. 2A–D and the substrate 32 of FIG. 3 are advantageously fabricated of transparent materials to permit the use of a colored backing 44, which may be of paper, to selectively color the substrates 24 and 32 to enhance the appearance of an image formed by the picture elements 22 or 26. Acetate film has been utilized for the substrate 24. The substrate 32 is formed of a rigid material such as a polycarbonate resin known commercially as Lexan. The indicia 39 may alternatively be placed on the backing 44. An alternative embodiment comprises a substrate of an opaque material such as wood or metal.

The tonality of the picture elements 26, as well as that of the elements 22C, are shown by way of example as being accomplished by a variation in the density of graphic markings on the elements 26 and 22C. The marks are of a dark color while the remaining portion, or background, of the elements 26 and 22C is of a light color. It is seen that in the darker tones, the mark density is high with narrow spaces between the marks. In the lighter tones, the mark density is low with relatively wide spaces between the marks.

In accordance with the invention, the picture elements produce a photographic effect which delineates specific regions of an image and precisely recreates the respective tones of the individual regions. The production of the photographic effect may be demonstrated with reference to the image of the human face portrayed on the display 20. The image was obtained by photographing a sculpture of a human being, the sculpture being in stone, and then converting the photograph of the sculpture into the image of the display 20 by a process, to be described hereinafter, of selecting picture elements from a set of picture elements having a predetermined number of tones. The photographic effect is so dramatic that, upon viewing the display 20 at the proper distance, the stone of the sculpture may be perceived. The photographic effect is due to the selection of picture elements in a range of tones in accordance with the tones obtained in half tone photography. The picture elements are placed on a grid having the same form as the grid of a half tone screen. The overlapping of the picture elements inhibits the perception of the edges of the individual picture elements while enhancing the perception of the edges of the various regions of the image.

In selecting the number of picture elements to be utilized in forming a display, such as the display 20, it is noted that a relatively large number of very small elements permits the portrayal of fine detail; however, the elements may be too small for easy manipulation. A small number of larger picture elements, while not reproducing the finest detail, does permit facile manipulation of the picture elements. In accordance with a preferred embodiment of the invention, the display 20 has 4000 picture elements in a format measuring 16 inches by 20 inches, with each of the picture elements being centered on alternate squares of a grid having five squares to the inch. At viewing distances in excess of ten feet, the eye of an observer integrates the coloration of the individual picture elements 22A, or alternately the picture elements 22B–C and 26, to provide uniformly colored regions as perceived by the observer. At viewing distances in excess of twenty feet, the regions of the image on the display 20 are well defined as perceived by the observer.

While the number of picture elements is sufficiently large to require several hours in the assembly of the display 20, nevertheless, the number of picture elements is much smaller than that which would be found in a photograph printed in a newspaper by conventional means wherein each minute dot of ink is a picture element. To facilitate the construction of the display 20 by more than one person simultaneously, the indicia 39 may be drawn facing opposite sides of the display 20. Such an arrangement is shown in FIG. 3 wherein two such indicia, identified by the legends 39A–B, are imprinted on the substrate 32 at locations within the grid 36 and face in opposite directions.

With reference to the grid 36 of FIG. 3, the unit cell 38 is useful in explaining the relationship of density of coloration, or of markings, per unit cell of the display 20 to the tonality perceived by an observer. The relationship applies to the picture elements 22A–B of differing sizes, the picture elements 22C and 26 of a common size and circular shape, as well as to picture elements of other shapes as will be seen in FIG. 4. The relationship may be understood with reference to the foregoing viewing distance of the display 20, at which distance the individual picture elements are too small to be readily noticed by the eye of an observer. As was noted hereinabove, each cell 38 represents the minimum region of the image which is readily resolved by the eye, and is seen to be larger than a picture element, four elements 26 being shown in the exemplary cell 38. By integrating the areas of all the marks in all the picture elements in a cell 38 to produce the total area of coloration, and by comparing the total area of coloration to the area of the cell 38, it is seen that the perceived tonality depends on the fraction of the coloration area to the cell area. The fraction is the same for all cells and provides the same tonality irrespectively of whether picture elements of differing sizes, such as the elements 22A–B, or of the same size, such as the elements 22C and 26, are utilized. In the event that is is desired to reduce the size of a cell 38 to reduce the aforementioned viewing distance, this necessitating the use of smaller picture elements, the elements 26 are preferred since their stems 30 are readily grasped even though their tiles 28 would be smaller to accommodate the smaller cells.

The picture elements may be fabricated from a variety of materials depending on whether a rigid or flexible element is preferred, and depending on the desired textural qualities such as a smooth or rough surface. Exemplary materials include plastic, paper, cloth, glass, metal, wood and rubber.

With reference to FIGS. 2A–C which portray the lips and a portion of the nose of the image of FIG. 1, the overlapping of the picture elements permits a blending of contiguous regions as is accomplished in photography. The overlapping of picture elements also enhances the perception of both straight boundaries and curved boundaries between contiguous regions of the image. The boundary at the upper edge of the lip is enhanced by the distribution of cells of picture elements of lighter tones, than the tones of the lip, immediately above the lip. Even though relatively few picture elements are utilized in the region between the upper and lower lips, the boundaries of the lips are still well defined when the image is viewed at the aforementioned viewing distances. Thereby, the display 20 serves as an educational experience in demonstrating the effect of an array of picture elements on the perceptual powers of the eye. Further demonstration is obtained by the experimental altering of the tones of the picture elements from those recommended by the indicia such as the indicia 39 of FIGS. 2D and 3.

Figure 4:
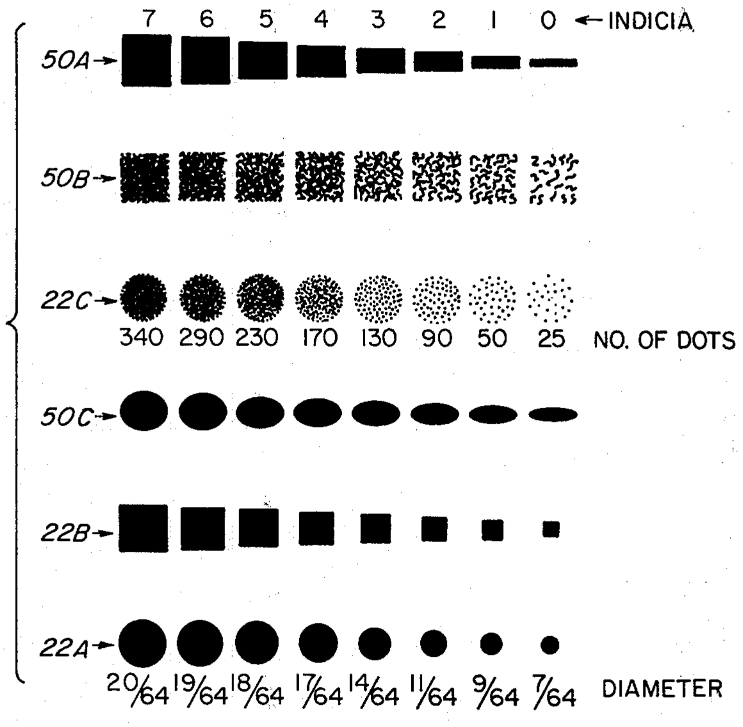
FIG. 4 shows sets of picture elements of differing shapes, sizes, coloration and graphic design.

Referring now to FIG. 4, there are seen six sets of exemplary picture elements, one set being presented in each row of the figure. The elements of three of the sets have already been seen in the FIGS. 2A–C, namely, the elements 22A–C. Sets of three other elements 50A–C are presented by way of comparison. The elements of a row are located in registration with the corresponding elements of the other rows to provide columns. The elements of the left hand column produce the darkest tone and are identified at the top of the figure by the indicia #7. The tonality varies to progressively lighter tones towards the right with the elements of the right hand column producing the lightest tone and being identified at the top of the figure by the indicia #0. Beneath the set of the elements 22C is presented a set of numbers which represent the number of dots used in creating each of the respective elements 22C. In the darker tones, there is considerable overlapping of the dots in the elements 22C. The set of fractions presented beneath the set of elements 22A represents the diameters, in inches, of the respective elements 22C. The indicated diameters are for a display utilizing the aforementioned grid size of five cells to the inch.

The elements 50A and 50C are seen to vary in size in one dimension in comparison to the two-dimensional variation of the elements 22A and 22B. The effect of the one-dimensional variation is most pronounced when the picture elements are oriented in a preferred direction, the orientation being accomplished as will be described in FIG. 7. The elements 50B show that tonality can be accomplished by markings, such as wavy lines, in lieu of the dots of the elements 22C. The resulting textural effect of such markings may be enhanced by embossing the surface of the element 50B, as well as the surfaces of the other elements, or by other treatment of the surface such as the use of fibrous or velvet types of material thereon.

Figure 5:
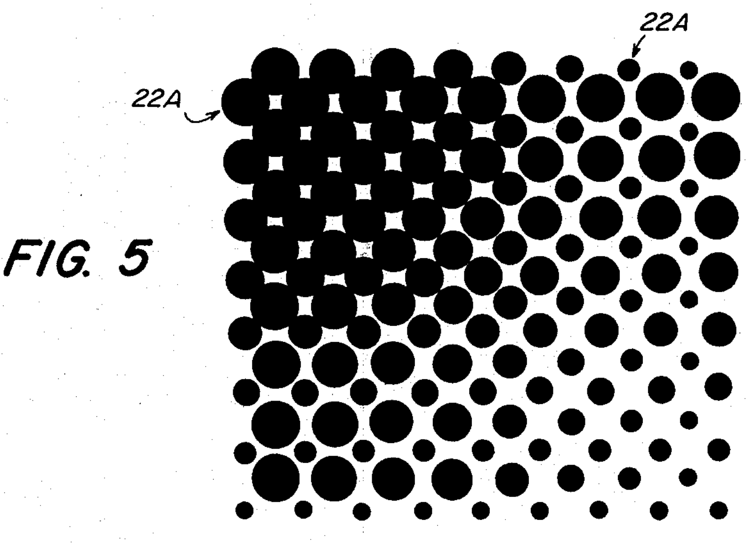
FIG. 5 shows an array of eight rows of circular picture elements arranged in decreasing size and interleaved with a second array of circular picture elements arranged in columns of decreasing size.

FIG. 5 demonstrates a two-dimensional variation in tonality by use of the elements 22A. The arrangement of the elements 22A is in the form of a set of eight rows interleaved with a set of eight columns. In any one row of the set of rows, there are eight elements of the same value. Similarly, in any one column of the set of columns, there are eight elements of the same value. The indicia of the elements of the rows of the set of rows vary from a value of #7 at the top to a value of #0 at the bottom. The indicia of the elements of the columns of the set of columns vary from a value of #7 at the left to a value of #0 at the right. The larger overlapping elements in the upper left corner produce a dark appearance in which only a small amount of the light background shows through. In the lower right corner, the smaller elements produce a lighter appearance because of the relatively large amount of the light background which is visible.

By utilizing the grid 36 of FIG. 3 with reference to the arrangement of FIG. 5, it is seen that the largest of the elements 22 or 50 are slightly larger than a square of the grid 36 so that there is overlapping of the picture elements as was seen with the elements 26. A group of four elements 26 in a unit cell 38 plus the exposed areas of the substrate 32 is perceived by an observer as a uniformly colored region.

While eight different tones are shown in FIG. 4, it is understood that more or less tones might be utilized in constructing a display such as the display 20 of FIG. 1. In an experimental embodiment of the invention wherein the display 20 was constructed of only six tones, it was found that the image had characteristics of a poster with reduced photographic qualities. In a second experimental embodiment wherein twelve tones were utilized in constructing the display 20, the photographic effect was excellent but the construction process was tedious because of the many different picture elements. A set of eight tones is preferred since the resulting image on the display 20 has good photographic qualities and the construction of the display 20 is readily accomplished.

Figure 6:
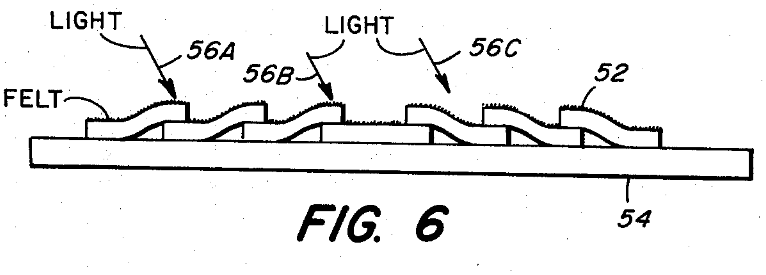
FIG. 6 is a side view of a group of overlapping flexible picture elements.

Referring now to FIG. 6, a group of flexible picture elements 52 are shown secured to a substrate 54 in an overlapping arrangement wherein some of the elements 52 are overlapping to the right and other ones of the elements 52 are overlapping to the left. Exemplary texture is produced by shadows which are cast on a felt surface of an element 52. With reference to rays 56A–C of light impinging obliquely on the elements 52, it is seen that shadows of the elements 52 are produced on the left side of the figure, but that no shadows are produced on the right side of the figure because of the opposite directions of the overlapping. The shadows appear to an observer as texture. Thus, by selectively altering the directions of the overlapping, the appearance of texture may be imparted to the image on the display 20 of FIG. 1.

Figure 7:
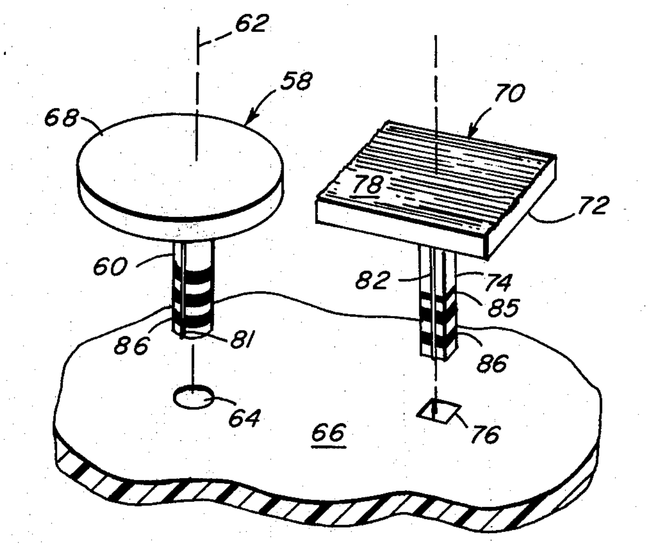
FIG. 7 is an isometric view of picture elements, one element being mounted on an off-centered stem, and a second element being mounted on a stem which mates with a corresponding aperture in a substrate to provide a preferred orientation for a graphic design, or texture, of the element.

Referring now to FIG. 7, there is seen a picture element 58 having a stem 60 mounted to one side of a central axis 62. The stem 60 has a round cross section as is indicated by the round aperture 64 positioned in a substrate 66 beneath the stem 60. By rotating the element 58, the center of its tile 68 can be moved about the axis 62 and thereby provide a small offset to the position of the element 58. The selective offsetting of some picture elements relative to other picture elements results in a local variation in tonality similar to such variation in a stroke of an artist's paint brush.

Also seen in FIG. 7 is a picture element 70 having a tile 72 of square shape, the tile 72 being mounted on a stem 74 having a square cross section. An aperture 76 is provided in the substrate 66, the aperture 76 having a square shape for mating with the stem 74 upon insertion of the stem 74 in the aperture 76. The face of the tile 72 is embossed with a design 78 having a preferred direction of orientation. In view of the square shape of the aperture 76 and the stem 74, there are four selectable directions of orientation of the design 78. The number of selectable directions of orientation can be changed, by way of example, to six directions by using a stem and aperture of hexagonal shape (not shown), or to three directions by using a stem and aperture of triangular shape (not shown). When the picture element 70 is used in forming a display, such as that of FIG. 1, the various regions of the subject portrayed in the display can be enhanced by selecting a specific direction of orientation of the design 78 for each region of the subject.

The picture elements 58 and 70 are secured in an exemplary fashion by means of frictional contact with the substrate 66. The frictional contact is provided by ribs 81–82 extending lengthwise along the stems 60 and 74, respectively. The ribs 81–82 are preferrably made of a flexible material such as a soft plastic or rubber and may be integrally molded with the stems 60 and 74, or adhesively secured thereto. The ribs 81–82 permit the elements 58 and 70 to be readily inserted into and removed from their respective apertures 64 and 76. The stems 60 and 74 are of uniform width throughout their lengths to permit the elements 58 and 70 to be secured at selectable depths within the substrate 66 so as to accommodate the overlapping of the picture elements as was described in FIG. 3.

The tonalities of the picture elements 58 and 70 are conveniently indicated by markings in the form of bands 85–86 around the stems 60 and 74. For example, a single narrow band 85 indicates a tone value #0; and two wide bands 86 and a narrow band 85 indicate a tone value #4 wherein the tone values correspond to the indicia of FIG. 4.

Figure 8:
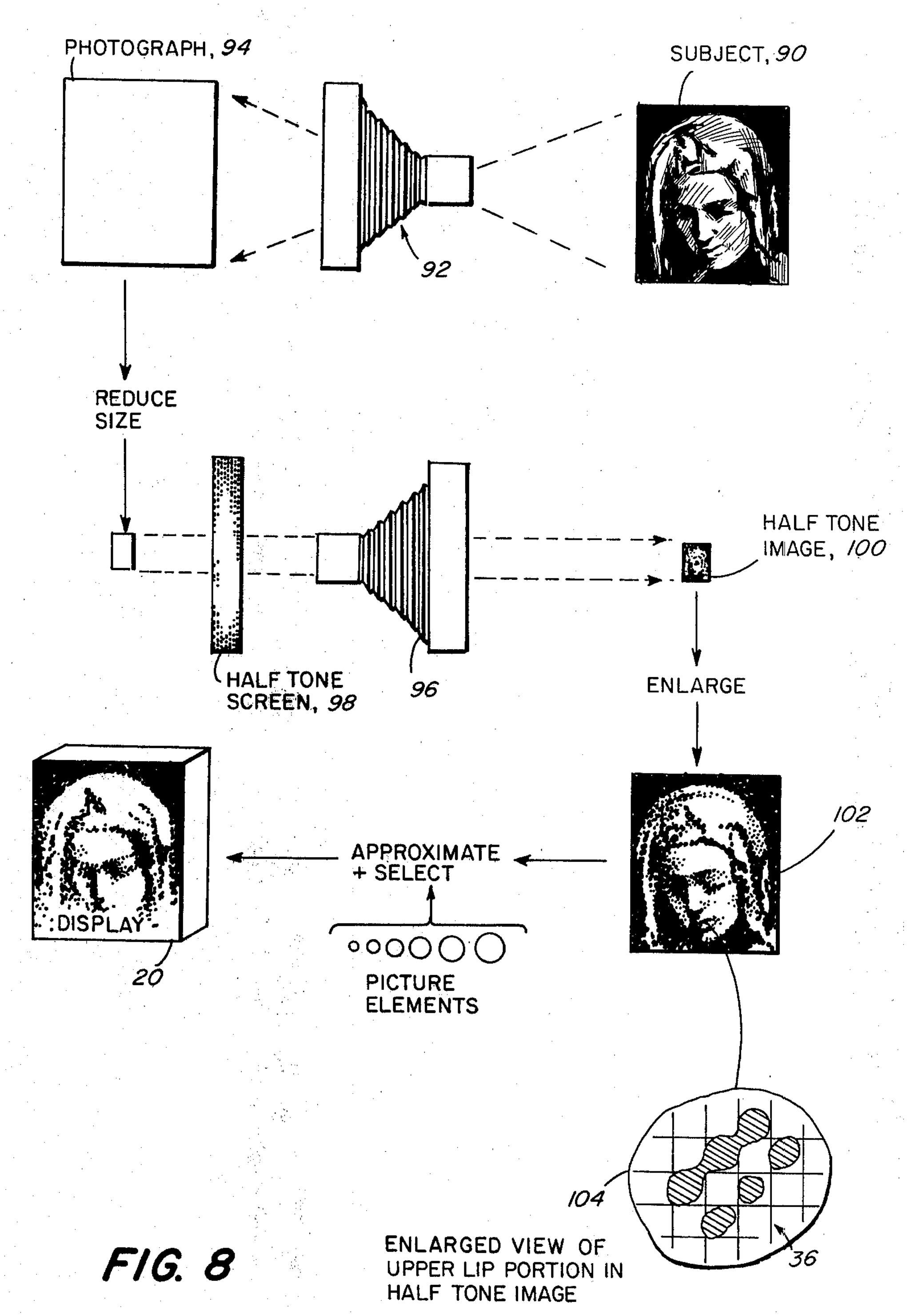
FIG. 8 is a diagram of a method of producing a half tone photograph, and the selection of picture elements in accordance with the invention.

Referring now to FIG. 8, there is presented a diagrammatic view of the procedure for photographing a subject 90 to obtain a half tone image which is then portrayed by the picture elements. The subject 90 is photographed by a camera 92 to produce a photograph 94 thereof. The photograph 94 is then reduced in size and photographed by a camera 96 through a half tone screen 98 of conventional resolution, such as 65 lines per inch, to produce a coarse half tone image 100 of reduced size. In order to produce the aforementioned exemplary display utilizing a grid of five squares to the inch, the foregoing reduction in size is by a factor of thirteen to convert the line density of 65 lines per inch to five lines per inch.

The reduced size half tone image 100 is then enlarged to the size of the photograph 94 to produce a coarse half tone image 102 of five lines to the inch. The coarse image 102 is composed of an array of irregularly shaped dots, some of which are joined together as is shown in an enlarged view 104 of the upper lip portion of the half tone image 102. A grid, such as the grid 36 of FIG. 3, is then placed over the coarse image 102, and the values of tonality in the respective squares of the grid are approximated by the tonalities of the individual picture elements of the sets of picture elements such as the picture elements 22 and 50 of FIG. 4. The indicia 39 of FIGS. 2D and 3 are then placed on the substrate 24 to identify the selected picture elements. Finally, the picture elements are secured to the substrate 24 to produce the display 20.

The foregoing steps of reducing the size of the photograph 94, photographing through the half tone screen, and enlarging the half tone image 100 provide a convenient method of producing a coarse half tone image having the desired number of lines per inch, or squares per inch, in the grid 36. Thus, by altering the factor of reduction and enlargement, the sizes of the picture elements, such as the elements 22C of FIG. 2C, may be selected to provide a picture element having a size which permits facile manipulation. Alternatively, a coarse half tone screen may be constructed, for example, a screen having a resolution of five lines per inch, in which case the photograph 94 may be photographed directly through the coarse half tone screen to provide the image 102 without the steps of reduction and enlargement.

It is noted that, with respect to the step of selecting a picture element such as the element 22C of FIG. 4 to approximate the value of tone in a cell of the image 102, the selected element 22C has a prescribed number of dots. As has been described hereinabove, the dots may be of a color such as alizarin crimson or cadmium red. As seen in FIG. 4, the darker tones are obtained by a greater density of the dots. The density of the dots in the darkest tone is nearly fourteen times the density of the lightest tone. In the event that it is desired to reduce the foregoing range in density of the dots, it has been found that the photographic effect can be maintained with a reduced range of density of the dots if the dots of the lighter tones are produced from a lighter color and the dots of the darker tones are produced from a darker color. For example, the cadmium red may be used for the dots of the lighter tones and the alizarin crimson may be used for the dots of the darker tones. The result is pleasing and has characteristics which are found in the photographic printing process known as posterization.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A display comprising:

a set of picture elements;

a substrate having locations thereon for mounting said picture elements, said locations being uniformly spaced on said substrate at the points of a grid, said grid being an enlargement of the grid of a photographic half tone screen, a plurality of said elements having a size greater than the spacing between the points of said grid;

means for mounting said elements to said substrate at said locations, individual ones of said plurality of elements overlapping each other; and wherein each of said elements provides a tone approximating the tone of a grid cell of a half tone photograph produced by said screen.

2. A display according to claim 1 wherein said set of elements consists of a predetermined number of subsets of said elements, each element in one of said subsets having equal tonality, the tonality of the elements in one of said subsets differing from the tonality of the elements in a second of said subsets.

3. A display according to claim 2 wherein the tonalities of said elements is provided by coloration of said elements of a contrasting color to a coloration of said substrate.

4. A display according to claim 2 wherein the tonalities of said elements is provided by coloration of said elements, said coloration comprising markings, the markings of the elements of one of said subsets being of a first color, and the markings of the elements of a second of said subsets being of a second color.

5. A display according to claim 2 wherein said elements comprise stem means and tile means, said stem means elevating said tile means of individual ones of said elements to differing heights above said substrate.

6. A display according to claim 5 further comprising means for securing said stem means to said substrate to maintain said tile means at said differing heights.

7. A display according to claim 1 wherein each of said elements comprises tile means and means for elevating said tile means above said substrate.

8. A display according to claim 7 wherein each of said elements includes means for identifying the tone provided by each element.

9. An imaging system comprising:

a substrate;

a plurality of groups of picture elements to be located on said substrate for forming an image on said substrate, a set of said elements consisting of one element from each of said groups providing a set of tones on said substrate, each element of said set producing a tone different from the tone produced by another element of said set;

means for positioning said elements on said substrate at the locations of a grid of uniformly spaced apart locations;

each of the elements of at least one of said groups being larger than the spacing between said locations to permit the overlapping of elements positioned at adjacent ones of said locations; and wherein each of said elements has the same tone producing characteristic, said characteristic being of a class of tone producing characteristics consisting of element size, coloration, and graphic density.

10. A system according to claim 9 wherein said set of elements comprises at least six elements, each of said elements of said set having a different size.

11. A system according to claim 10 wherein each of said elements has the same shape and coloration.

12. A system according to claim 10 wherein each of said elements is textured, said elements overlapping each other in a prescribed direction.

13. A system according to claim 10 wherein each of said elements has a graphic design, and wherein said positioning means includes means for orienting said design in a predetermined direction.

14. A system according to claim 10 wherein said positioning means includes means for securing said elements at predetermined elevations above said substrate, said positioning means permitting removal and repositioning of said elements.

15. A system according to claim 9 wherein said set of elements comprises at least six elements, each of said elements of said set having a graphic design of different density.

16. A system according to claim 15 wherein each of said elements has the same size and coloration.

17. A system according to claim 15 wherein the elements of at least one of said groups overlap each other in a prescribed direction.

18. A system according to claim 15 wherein said positioning means includes means for orienting said design in a predetermined direction.

19. A system according to claim 15 wherein said positioning means includes means for securing said elements at predetermined elevations above said substrate, said positioning means permitting removal and repositioning of said elements.

20. A system according to claim 9 wherein said set of elements comprises at least six elements, each of said elements having first and second colors, the relative amounts of said first and said second colors differing in each of said elements of said set.

21. A system according to claim 20 wherein said first and said second colors are chromatic colors.

22. A system according to claim 20 wherein said first and said second colors are achromatic colors.

23. A system according to claim 20 wherein each of said elements has the same size and shape.

24. A system according to clain 20 wherein the elements of at least one of said groups overlap each other in a predetermined direction.

25. A system according to claim 20 wherein each of said elements has a graphic design, and wherein said positioning means includes means for orienting said design in a predetermined direction.

26. A system according to claim 20 wherein said positioning means includes means for securing said elements at predetermined elevations above said substrate, said positioning means permitting removal and repositioning of said elements.

27. A system according to claim 9 wherein said substrate is opaque.

28. A system according to claim 9 wherein said substrate has indicia thereon for designating the tonalities of the picture elements to be positioned at each of said locations.

29. A system according to claim 28 wherein said substrate is transparent.

30. A system according to claim 28 wherein said substrate comprises front and back laminae, said front lamina being transparent and said back lamina being colored.

31. A system according to claim 30 wherein said indicia are located on said back lamina.

32. A system according to claim 28 wherein said positioning means comprises a set of apertures in said substrate, one of said apertures being positioned at each of said locations, said positioning means further comprising stems located on each of said elements, said stems mating with said apertures for positioning said elements at their respective locations.

33. A system according to claim 32 wherein a stem is displaced from an axis of a corresponding one of said picture elements to permit a variation in the position of said element about its location.

34. A system according to claim 32 wherein said apertures are configured to orient their corresponding picture elements in at least one prescribed direction.

35. A method of designating the tonalities of picture elements for producing an imaged on a display comprising:

photographing a subject to be imaged on said display;

producing a coarse half tone likeness of said subject from said photograph;

comparing elemental regions of said likeness with individual picture elements of a set of said picture elements having predetermined values of said tonalities; and selecting individual ones of said picture elements of said set.

36. A method according to claim 35 wherein said producing of said likeness comprises:

reducing the size of said photograph to produce a reduced photograph;

photographing said reduced photograph through a half tone screen to produce a half tone photograph; and enlarging said half tone photograph to produce said coarse half tone likeness.

* * * * *